United States Patent [19]

Guntrum et al.

[11] 3,787,963

[45] Jan. 29, 1974

[54] METHOD OF FABRICATING A MULTI-HEAD MAGNETIC TRANSDUCER ASSEMBLY

[75] Inventors: William E. Guntrum, Mustang; Harold W. Pexton; Michael R. Shores, both of Oklahoma City, all of Okla.

[73] Assignee: Honeywell Information Systems, Inc., Waltham, Mass.

[22] Filed: Feb. 5, 1973

[21] Appl. No.: 329,481

[52] U.S. Cl. ............................ 29/603, 179/100.2 C
[51] Int. Cl. ............................................. G11b 5/42
[58] Field of Search ................ 29/603; 179/100.2 C; 340/174.1 F; 346/74 MC

[56] References Cited

UNITED STATES PATENTS

| | | | |
|---|---|---|---|
| 3,660,892 | 5/1972 | Tanaka et al. | 29/603 |
| 3,534,470 | 10/1970 | Faure et al. | 29/603 |
| 3,400,386 | 9/1968 | Sinnott | 29/603 X |
| 3,064,333 | 11/1962 | Kristiansen et al. | 29/603 |

*Primary Examiner*—Charles W. Lanham
*Assistant Examiner*—Carl E. Hall
*Attorney, Agent, or Firm*—Gerald R. Woods; William F. White

[57] ABSTRACT

A method of fabricating a multihead magnetic transducer is disclosed herein. The method utilizes a number of modular fixtures each of which contains a first cavity which positionally orients a head core element and a second cavity which positionally orients a spacer-shield element. The spacer-shield and head core elements are so positioned within each modular fixture so as to be in contact with each other. The modular fixtures are mated together so as to position each core and spacer-shield element with respect to the core and spacer-shield element in the adjacent modular fixture. The core and spacer-shield elements within the mated modular fixtures form a stack of elements which are in immediate contact with each other.

12 Claims, 11 Drawing Figures

METHOD OF FABRICATING A MULTI-HEAD MAGNETIC TRANSDUCER ASSEMBLY

BACKGROUND OF THE INVENTION

The invention relates to the fabrication of magnetic transducer heads, and in particular, to the fabrication of multihead magnetic transducer assemblies wherein the heads are to be precisely positioned with respect to each other.

In the fabrication of multiple head magnetic transducer assemblies, it is usually necessary to carefully position each individual transducer head with respect to the other transducer heads within the assembly. A critical part of any such positioning process is the spacing of these heads so as to achieve consistent and uniform distances between the heads. This insures that each resulting multihead transducer is interchangeable and that each will be capable of reading or recording similarly spaced tracks of information on a recording medium.

Previous methods of positioning several transducing heads with respect to each other, have usually required complicated and expensive handling procedures for the small and delicate transducer heads. One particular method which has found wide spread use requires that a housing be first machined so as to contain a plurality of spaced slots into which the magnetic transducer heads (or head cores) are to be inserted. An example of such a method is shown in U.S. Pat. No. 3,327,313 to F. A. Oliver, issued on June 20, 1967. Not only does this particular method require a delicate handling of the head cores, but it also requires complex and expensive machinery for providing the precisely spaced slotting within the housing.

The procedure is even further complicated when shield elements are inserted between the positioned head cores. Due to the rather compact nature of a multiple head magnetic transducer unit, the magnetic shields must be inserted very close to the heads themselves.

When using the slotted housing approach, additional slots must be provided in the housing by complex and expensive machinery.

OBJECTS OF THE INVENTION

It is therefore an object of the invention to provide a method of fabricating a multihead magnetic transducer wherein the amount of time devoted to the handling and the positioning of the delicate core heads is minimized.

Another object of the invention is to reduce the amount of complex machinery and expensive tooling heretofore used in the manufacture of multiple head transducer assemblies.

A still further object of this invention is to provide a simplified and less complicated method of inserting the various shield elements into a multiple head magnetic transducer assembly.

SUMMARY OF THE INVENTION

The aforementioned objects are achieved according to the present invention by a fabrication method wherein each individual transducing head is first inserted into a respective modular fixture that orients the head in a prescribed manner. A spacer-shield element is next inserted into the modular fixture in such a manner as to define a close, compact relationship with the transducing head. The modular fixtures are next mated together in a stacked relationship so as to define a multihead magnetic transducer assembly. The head and spacer-shield elements within this stack of modular fixtures form an integral stack of contacting elements. The resulting stacked arrangement of modular fixtures and internally stacked elements is then encapsulated using an appropriate vacuum potting system. The encapsulated assembly is thereafter machined to form a final transducing configuration.

In a preferred embodiment, the multihead magnetic transducer assembly is first fabricated in two half assemblies. The half assemblies are joined together to form a completed multihead magnetic transducer.

BRIEF DESCRIPTION OF THE DRAWINGS

For a better understanding of the present invention, reference should be made to the accompanying drawings wherein.

Figure 1:
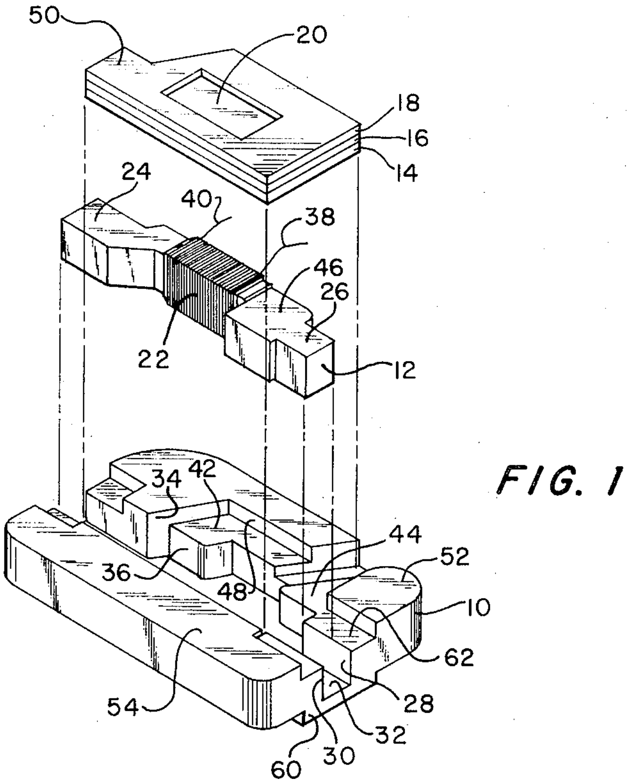
FIG. 1 is an exploded view of a modular fixture, a transducing head element, and a spacer-shield element.
Figure 3:
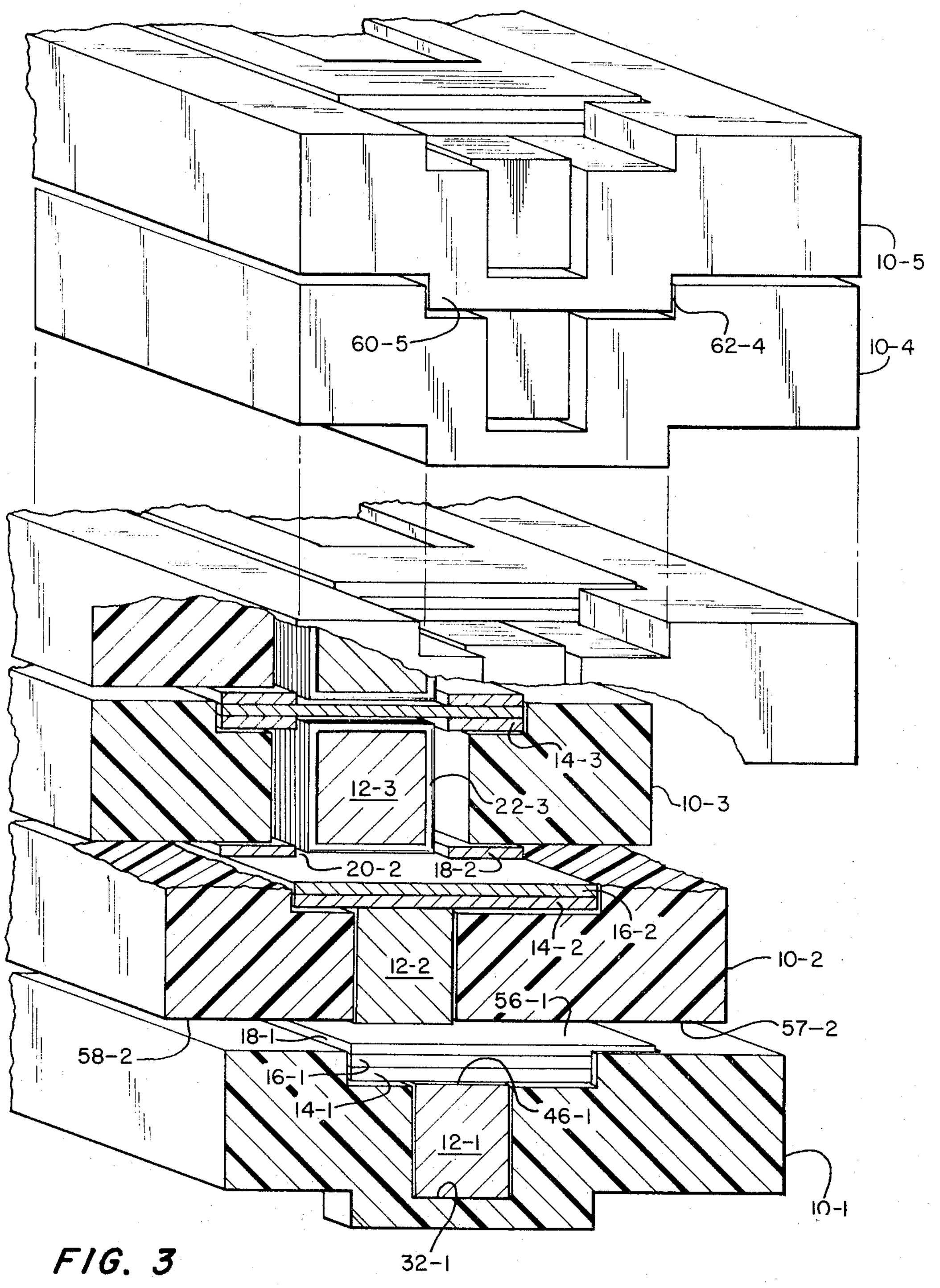
Figure 4B:
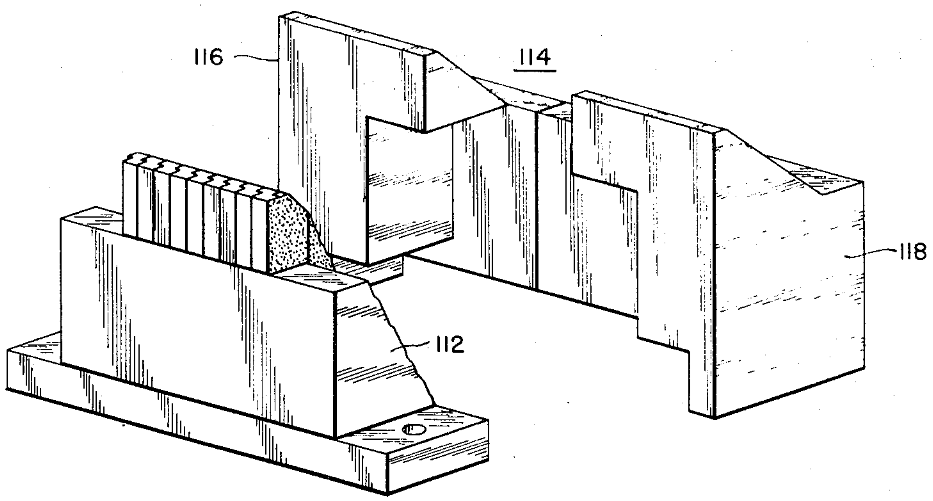
Figure 4A:
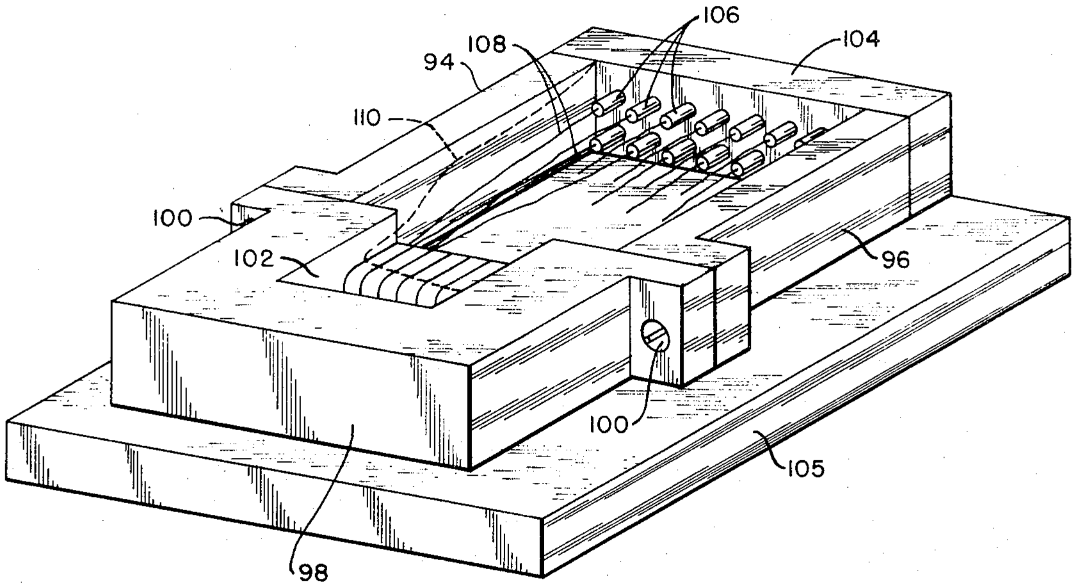
Figure 5:
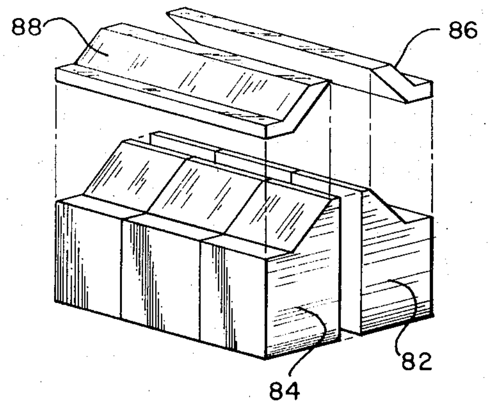
Figure 6:
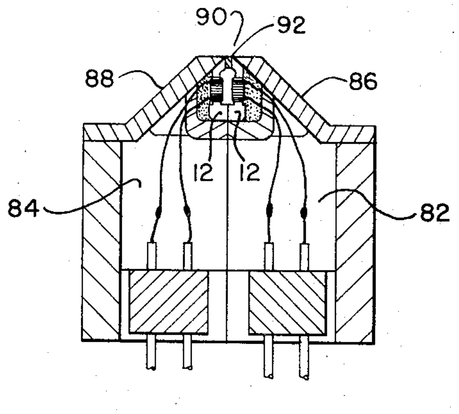

FIGS. **2*a*, 2*b* and 2*c* are top, end, and front views, respectively, of the elements of FIG. 1** when assembled together;

FIG. 3 is a perspective view partially in section illustrating the stacked relationship of a group of the assembled elements of FIGS. **2*a*, 2*b* and 2*c***;

FIG. **4*a* illustrates a holding fixture in which the stacked configuration of FIG. 3** is wired to a connector and is potted;

FIG. **4*b* illustrates the insertion of the potted assembly in FIG. 4*a*** into a housing;

FIG. **4*c* illustrates the machining of the stacked configuration of FIG. 3**;

FIG. 5 illustrates the joining together of two half assemblies, together with a set of angled pieces for the top portions of each half assembly;

FIG. 6 is a sectional view of the assembled elements of FIG. 5; and

Figure 7:
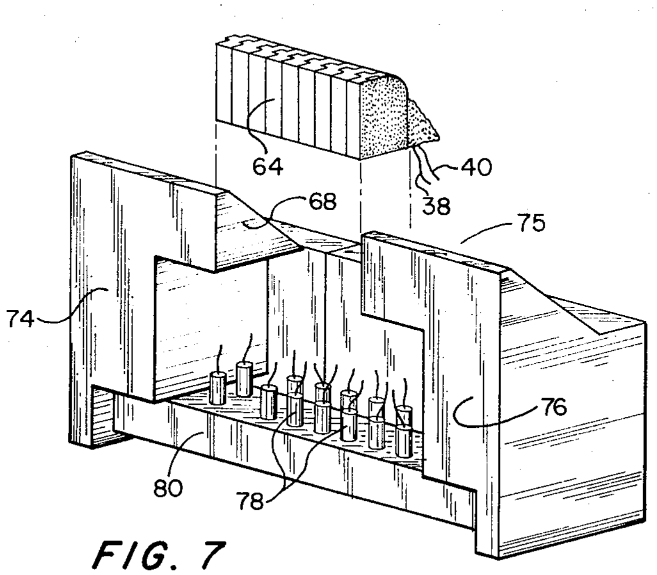

FIG. 7 illustrates an alternate assembly technique which eliminates the holding fixture.

DETAILED DESCRIPTION OF THE INVENTION

Referring to FIG. 1, a modular fixture 10 is shown with a core 12 positioned directly above it and ready for insertion therein. A spacer 14, a shield 16 and a second spacer 18 are positioned above the core 12 and are also ready for insertion into the modular fixture 10.

The spacers 14 and 18, made of brass or any suitable conductor, are laminated to the shield 16 that is preferably made of Hy-Mu 80. The lamination process consists of applying a heat sensitive adhesive to the mating surfaces of each spacer and pressing the spacers against the shield in a heating press which causes the adhesive to bond and flow allowing the pressure to set the thickness very accurately. The resulting spacer-shield element has an extremely accurate thickness which will be relied upon hereinafter. The core 12 is similarly formed of laminated parts which are bonded together by a heated press causing a heat sensitive adhesive to flow and allow for the setting of an accurate core thickness. Each lamination of the core 12 is itself preferably formed from the material Hy-Mu 80. The modular fixture 10 is preferably formed from a plastic molding material that is dimensionally stable and structurally sound.

The spacer 18 is seen to contain a relief hole 20 which is located above a coil 22 wrapped around the core 12. The spacer 14 contains a similar relief hole (not shown) which is sufficiently deep to accommodate the wire thickness of the coil 22 wrapped around the core 12. The necessity for the relief holes in the particular spacers 14 and 18 will be explained hereinafter.

The core 12 is seen to contain a set of tab ends 24 and 26 which insert into a first cavity within the modular fixture 10. One end of the first cavity is defined by a set of side locating surfaces 28 and 30 and a bottom locating surface 32. This end of the cavity receives the tab end 26. A similar set of locating surfaces appear st the other end of the first cavity for the tab end 24.

Figure 2A:
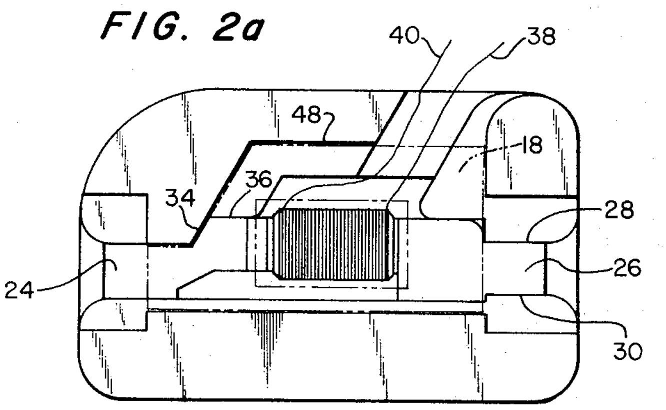
Figure 2B:
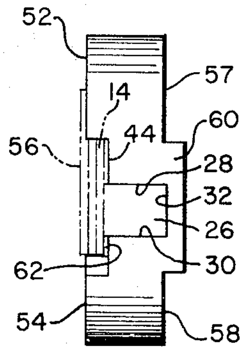
Figure 2C:
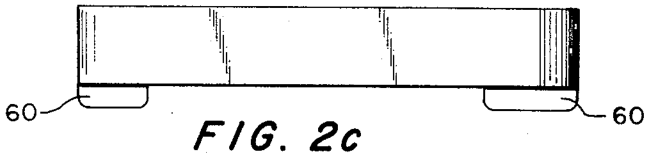

The core 12 slip fits into the modular fixture 10 as shown in FIGS. **2*a* and 2*b*. The elements shown in FIGS. 2*a* and 2*b* are labeled in a manner similar to how they appear in FIG. 1. The tab ends 24 and 26 are seen to fit relative to their respective locating surfaces in the first cavity. In addition, it is seen that several internal locating surfaces such as 34 and 36 within the modular fixture 10 cooperate with complementary sides of the core 12 to further define the orientation of the core. The modular fixture 10 opens to the rear to allow a set of coil leads 38 and 40 to extend out from the modular fixture itself. It is thus to be appreciated that the core 12 inserts into the modular fixture 10 with a minimum amount of handling. The core 12 and its leads 38 and 40 are thereafter manipulated through handling of the modular fixture 10.**

Following the insertion of the core 12 into the modular fixture 10, the spacer-shield element is next positioned within a second cavity of the modular fixture. The bottom of the second cavity is defined by surfaces such as 42 and 44 as shown in FIG. 1. The second cavity is seen to be considerably shallower than the first cavity. Referring to FIG. **2*b*, it is seen that the core 12 extends into the second cavity and that the spacer 14 rests on the top surface 46 of the core 12. The extension of the core 12 into the second cavity has been previously insured for by making the core thickness a critical dimension. The spacer-shield element otherwise fits into the second cavity of the modular fixture 10 as shown by the phantom lined spacer 18 in FIG. 2a. In particular, it is seen from FIG. 1 that the internal contour of the second cavity includes several internal locating surfaces such as the locating surfaces 34 and 48. These locating surfaces cooperate with the complementary sides of the spacer-shield element to define the desired spacer-shield element orientation. It is to be noted that the insertion of the spacer-shield element into the second cavity is easily facilitated by use of the tab 50.**

Referring to FIG. **2*b*, it is seen that the spacer 18 extends above the top surfaces 52 and 54 of the modular fixture 10. This extension of the spacer 18 above the top of the modular fixture 10 was previously provided for in the fabrication of the spacer-shield element by making the entire thickness of the spacer-shield element a critical dimension. The shield 18 provides a surface 56** which will support a second core within a second modular fixture as will be explained hereinafter.

The modular fixture 10 is next mated together with a number of other modular fixtures to form a stack of modular fixtures such as shown in FIG. 3. The partially sectioned stack in FIG. 3 illustrates the manner in which each core 12 and its respective spacer-shield element supports the next core and spacer-shield element combination.

In particular, the core 12-1 rests on the bottom surface 32-1 of the modular fixture 10-1 and supports a spacer-shield element on the top surface 46-1. This spacer-shield element (consisting of the spacer 14-1, the shield 16-1 and the spacer 18-1) in turn supports the core 12-2 on the surface 56-1. It is important to note that other than the first core 12-1 each successively stacked core such as 12-2 does not rest on the bottom surface of a first cavity but rather rests on a surface such as 56-1. This is due to the bottom surface 32 of each modular fixture 10 being slightly lower than the bottom contact surfaces 57 and 58 of each modular fixture (see FIG. **2*b*). These bottom contact surfaces such as 57-2 and 58-2 of the modular fixture 10-2 rest on the surface 56-1 of the spacer 18-1. Since the bottom surface (not shown) of the modular fixture 10-2 is slightly lower than the bottom contact surfaces 57-2 and 58-2, the shield 18-1 extends into the bottom of the first cavity of the modular fixture 10-2 and supports the core 12-2 on its surface 56-1.** This support is repeated by each of the stacked modular fixtures with their respective cores and spacer-shield elements.

It will be remembered that each of the spacers contain a relief hole such as 20. Each relief hole accommodates the wire thickness of a coil which would otherwise interfere with the contact between the core and the spacer. This is demonstrated in FIG. 3 by the coil 22-3 extending downwardly into the relief hole 20-2 in the shield 18-2 and extending upwardly into a similar relief hole in the spacer 14-3. The core 12-3 is thereby insured of substantial contact with the spacers 18-2 and 14-3.

Referring now to the top portion of the stack of modular fixtures in FIG. 3, it is seen that each modular fixture mates with the modular fixture immediately below. This mating is particularly shown for the modular fixtures 10-5 and 10-4. A bottom projection 60-5 of the modular fixture 10-5 is seen to register with a recess 62-4 of the modular fixture 10-4. Referring to FIGS. **2*a* and 2*c*, it is seen that the bottom projections 60 have a defined width. This is necessary in order to insure that the bottom projections will freely insert into the recesses 62 which are limited by the sides of the spacer-shield element such as indicated by the phantomed spacer 18 in FIG. 2*a*.**

It is to be appreciated that each of the modular fixtures 10-1 through 10-3 which appear in section in FIG. 3 are similarly mated. The resultingly stacked assembly of modular fixtures in FIG. 3 contain an aligned stack of cores and spacer-shield elements. This is due to the preestablished orientations of the respective elements within each modular fixture and due to the manner in which the modular fixtures are mated together. Moreover, each of the core and spacer-shields will be in contact with each other so as to precisely define the relative distances between successive transducer heads.

The stacked modular fixtures of FIG. 3 are inserted into a holding fixture such as the one shown in FIG. **4*a*. The holding fixture includes a first side wall 94, a second side wall 96 and a front wall 98 which is attached to side walls 94 and 96 by means of screws 100 extending through contiguous flanges on the walls. The front wall 98 includes a rectangular recess 102 into which the stacked modular fixtures are inserted. The rear wall of the holding fixture is formed by securing connector block 104 to side walls 94 and 96 by screws, not visible in FIG. 4a. The entire holding fixture sits on a base 105. Connector block 104 contains a number of individual wire terminals 106 which are then wired to the stacked modular fixtures through wires 108. To avoid drawing clutter, only a few of the wires 108** are shown.

The holding fixture is infused with a liquid epoxy which covers the components within the fixture to the depth illustrated by the dotted line 110. When the epoxy has solidified, front wall 98 is removed and the encapsulated modular fixtures are machined. The details of this machining operation are provided below as part of the description of several machining operations.

Figure 4C:
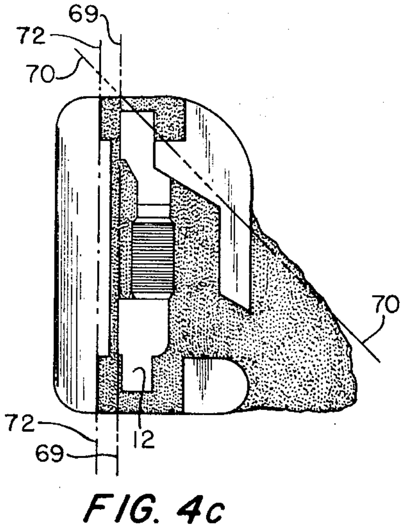

Referring now to FIG. 4*b*, the encapsulated assembly 112 is shown after its removal from the holding fixture. The encapsulated assembly 112 is next inserted into a housing 114 consisting of a left section 116 and a symmetrical right section 118. The assembly 112 and the sections 116 and 118 are potted to form a rigid unit. Second and third machining operations are then performed on the encapsulated assembly 112. The second and third machining operations, as well as the first, are illustrated in FIG. 4*c*.

Referring to that Figure, the first machining operation, performed in the holding fixture with front wall 98 removed, is a cut made along the dashed line 70. The second machining operation, performed with assembly 112 in place in housing 114 is a cut taken along line 72 which removes the bulk of the epoxy from the pole side of core 12. The third machining operation is a lapping operation which removes the epoxy remaining to the left of line 72 to expose the poles of core 12.

The resulting form is a completed half of a multihead assembly 82 shown in FIG. 6. A similar complementary half 84 is also constructed according to the invention. These halves are first brought into a confronting relationship as shown in FIG. 5 and thereafter joined together. A set of angled pieces 86 and 88 are also affixed to the respective halves 82 and 84 so as to provide a transducing wear surface. The resulting head configuration is shown in FIG. 6 wherein the cores 12 for the respective halves 82 and 84 are shown as completing a magnetic head with a transducing gap 90. In practice, a gap shim 92 would be used to maintain gap spacing.

FIG. 7 illustrates an alternate assembly technique. In carrying out the alternate technique, the stacked modular fixtures of FIG. 3 are encapsulated alone in a holding fixture (not shown). The resulting assembly 64 is inserted in a housing 75 consisting of a left section 74 and a right section 76. A connector block 80 with individual wiring terminals 78 is then secured to the lower end of housing 75. After leads 38 and 40 from each fixture in assembly 64 are connected to terminals 78, the entire unit is encapsulated. The machining operations described with reference to FIG. 4*c* are performed on this encapsulated unit.

While the alternate technique eliminates the need for a separate large holding fixture, it is not a preferred technique because of the difficulty of aligning the assembly 64 in the housing.

While a particular multihead magnetic transducer has been fabricated, it is to be appreciated that practically any multihead magnetic transducer could be fabricated according to the fabrication process disclosed herein. Specifically, a single multihead assembly could have been disclosed wherein separate half assemblies were not necessary. Furthermore, a half assembly could have been mated to a dissimilar second half to form a multihead assembly. These and other alternative types of multihead magnetic transducer assemblies could be fabricated according to the invention.

What is claimed is:

1. A method of fabricating a multihead magnetic transducer comprising the steps of:

forming a plurality of modular fixtures each of which contains a first cavity and a second cavity wherein the first cavity is substantially deeper than the second cavity;

forming at least one core element for each head of the multihead magnetic transducer;

inserting each core element into the first cavity of a respective modular fixture and positioning the core with respect to a plurality of locating surfaces within the first cavity;

forming at least one shield element for each head of the multihead magnetic transducer;

inserting each shield element into the second cavity of a respective modular fixture and positioning the shield element with respect to a plurality of locating surfaces within the second cavity;

stacking the plurality of modular fixtures so as to position each core a defined distance away from the core in the preceding modular fixture; and encapsulating the stacked plurality of modular fixtures with a fluid epoxy and allowing the epoxy to set to thereby form a molded assembly of modular fixtures.

2. The method of claim 1 wherein said step of forming at least one core element for each head of the multihead magnetic transducer further comprises the step of:

accurately defining the thickness of each core to be slightly greater than the depth of the first cavity below the second cavity.

3. The method of claim 2 wherein said step of inserting each shield element into the secnd cavity comprises the step of:

resting the shield element on the top surface of the core element which extends into the second cavity from the first cavity by virtue of the core thickness being slightly greater than the depth of the first cavity below the second cavity.

4. The method of claim 3 wherein said step of forming at least one shield element for each head comprises the step of:

accurately defining the thickness of each shield to be greater than the distance measured from the top of the core element to the top of the modular fixture when the core element has been inserted into the first cavity of the modular fixture.

5. The method of claim 4 wherein said step of stacking the plurality of modular fixtures comprises the step of:

resting each successive modular fixture on the top surface of the shield element extending above the top of the modular fixture immediately below.

6. The method of claim 5 wherein said step of stacking the plurality of modular fixtures further comprises the step of:

resting the core element of each successively stacked modular fixture on the top surface of the shield element extending above the modular fixture immediately below.

7. The method of claim 6 wherein each module is so formed as to include a projection along a bottom surface and a recess along a top surface and said step of stacking the modules further comprises the steps of:

stacking a second module over a first module; aligning said second module with respect to said first module by inserting the projection along the bottom surface of said second module into the recess along the top surface of said first module; and repeating the previous steps until the requisite number of modules have been stacked and aligned.

8. The method of claim 2 wherein said step of accurately defining the thickness of each core comprises the steps of:

applying a heat sensitive adhesive to a plurality of laminations; stacking these laminations in a heat press;

heating the stacked lamintations so as to cause the adhesive to bond and flow; and allowing the pressure to accurately set the core thickness dimension.

9. The method of claim 7 wherein each core element is wrapped with a coil and said step of forming at least one shield element for each head comprises the steps of:

forming at least two spacer laminations from brass;

providing relief holes in each spacer lamination, the depth of each relief hole being greater than the wire thickness of the coil which extends above the surfaces of the core;

forming at least one solid lamination from Hy-Mu 80; and adhering the spacer laminations to either side of the solid lamination.

10. The method of claim 9 wherein said step of adhering the spacer lamintations to either side of the solid lamination comprises the steps of:

applying a heat sensitive adhesive to the surfaces of the spacer laminations which will contact the solid lamination;

stacking these laminations with the contacting surfaces of the spacer lamination in contacting relationship with the solid lamintation;

heating the stacked laminations so as to cause the adhesive to bond and flow; and allowing the pressure to accurately set the shield thickness dimension.

11. A method of fabricating a multihead magnetic transducer having a plurality of core elements separated by a plurality of shield elements juxtaposed in stacked relation in one direction which includes the steps of:

providing a plurality of interlocking modular fixtures with cavities formed therein for retaining a core element and a shield element in position transverse to the one direction, said cavities further providing contact between an adjacent core and shield when said modular fixtures are in interlocking engagement;

stacking said modular fixtures in interlocking engagement with the desired number of cores and shields disposed therein to form a transducer;

encapsulating the stacked modules with a fluid epoxy and allowing said epoxy to set; and machining away portions of the stacked assembly to provide the desired shape of said transducer with portions of said modular fixtures remaining as part of the completed transducer.

12. A method of fabricating a multihead magnetic transducer comprising the steps of:

a forming at least one core element for each head;

b forming at least one shield element for each head of the multihead magnetic transducer;

c forming a plurality of modular fixtures each of which contains a first cavity with a plurality of locating surfaces therein which complement the side contour of a core element, and a second cavity with a plurality of locating surfaces therein which complement the side contour of a shield element;

d fitting a core element into the first cavity of a modular fixture by slip fitting the side contour of the core element relative to the plurality of locating surfaces within the first cavity;

e fitting a shield element into the second cavity of a first modular fixture by slip fitting the side contour of the shield element relative to the plurality of locating surfaces within the second cavity wherein the shield element slips relative to the plurality of locating surfaces until the shield element comes to rest on top of the core element;

f placing a second modular fixture on top of the shield element of the first modular fixture;

g fitting a core element into the first cavity of the second modular fixture by slip fitting the side contour of the core element relative to the plurality of locating surfaces within the first cavity wherein the core element slips relative to the plurality of locating surfaces until the core element comes to rest on top of the shield element which the second modular fixture is resting on;

h fitting a shield element into the second cavity of the second modular fixture by slip fitting the side contour of the shield element relative to the plurality of locating surfaces within the second cavity until the shield element comes to rest on the core element within the second modular fixture;

i repeating the steps f-h wherein each successive modular fixture becomes the second modular fixture and the first modular fixture becomes the previous modular fixture until the desired number of modular fixtures have been stacked together; and j encapsulating the stacked plurality of modular fixtures with a fluid epoxy and allowing the epoxy to set to thereby form a molded assembly of modular fixtures.

* * * * *